United States Patent Office 2,993,736
Patented July 25, 1961

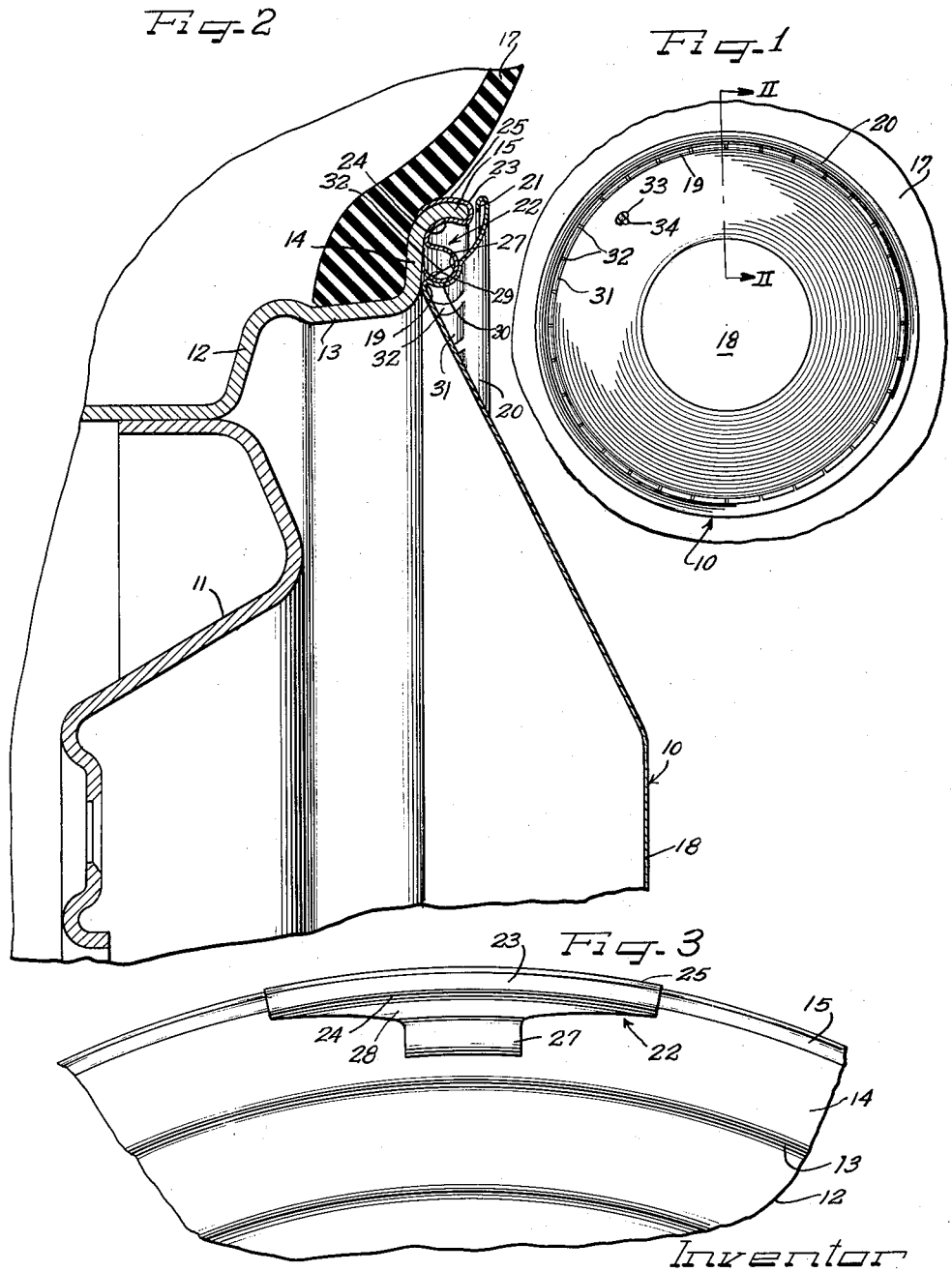

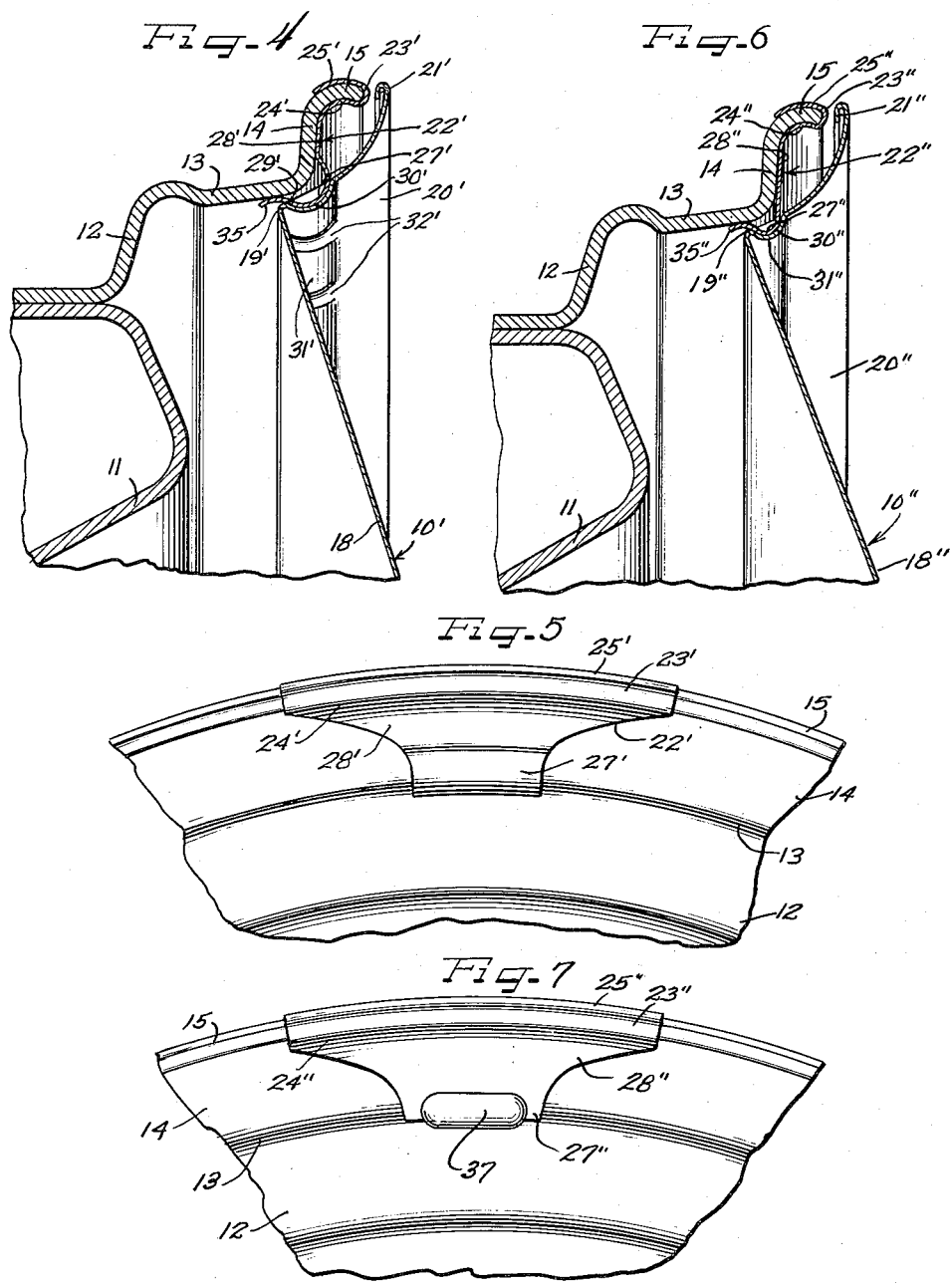

2,993,736
WHEEL COVER
George Albert Lyon, 13881 W. Chicago Blvd.,
Detroit 28, Mich.
Filed Nov. 12, 1957, Ser. No. 695,698
3 Claims. (Cl. 301—37)

The present invention relates to improvements in wheel structures and more particularly concerns the ornamental and protective covering of vehicle wheels.

An important object of the present invention is to provide an improved wheel structure having novel means for retaining a cover on the outer side of the wheel.

Another object of the invention is to provide a novel cover retaining means whereby a wheel cover is adapted to be retained in snap-on, pry-off relation on the outer side of a vehicle wheel.

A further object of the invention is to provide improved retaining clip means for retaining a cover over a vehicle wheel.

Still another object of the invention is to provide a low cost wheel cover and retaining means structure for vehicle wheels.

Other objects, features and advantages of the present invention will be readily apparent from the following detailed description of certain preferred embodiments thereof taken in conjunction with the accompanying drawings, in which:

FIGURE 1 is an outer side elevational view of a wheel structure embodying features of the invention;

FIGURE 2 is an enlarged fragmentary radial sectional detail view taken substantially on the line II—II of FIGURE 1;

FIGURE 3 is a fragmentary side elevational view of the wheel and one of the cover retaining clips with the cover removed;

FIGURE 4 is a radial sectional detail view similar to FIGURE 2 but showing a modification;

FIGURE 5 is an outer side elevational view of the wheel and the retaining clip of FIGURE 4 with the cover removed;

FIGURE 6 is a radial sectional view similar to FIGURE 2 but showing a further modification; and FIGURE 7 is an outer side elevational fragmentary detail view of the wheel showing a further modified form of cover-retaining clip.

Having reference to FIGURES 1, 2 and 3, a wheel cover 10 is constructed and arranged to be disposed in covering relation to the outer side of a vehicle wheel and more particularly an automobile wheel including a disk spider wheel body 11 supporting a tire rim 12 of the multi-flange drop-center type provided with an intermediate generally axially outwardly extending flange 13 merging into a terminal flange that has a generally radially outwardly extending portion 14 and a generally axially outwardly extending lip portion 15. A pneumatic tire 17 of the tubeless type is adapted to be supported by the tire rim which thus provides with the tire an air chamber for inflation of the tire.

Although the cover 10 is shown as a full disk type, that is, a plate of a diameter to cover the wheel inclusive of the wheel body 11 and the tire rim 12, it will be understood that if preferred the cover 10 could be a ring which would cover only the tire rim and a portion of the wheel body, with a central hub cap covering the center of the wheel. However, for economy purposes the instant cover can be produced at such low cost that a two-piece cover assembly would hardly be warranted competitively. Moreover, the cover 10 can be made from inexpensive sheet or strip stock such as steel, stainless steel, brass, aluminum, or the like. Simple die pressing or drawing equipment will suffice for production purposes.

Centrally the cover 10 has a crown portion 18 for overlying the wheel body 11 and sloping generally radially outwardly and axially inwardly to an indented annular rigid rib 19 at juncture with a generally radially and axially outwardly extending annular marginal cover portion 20 of an outside diameter to substantially entirely overlie the tire rim terminal flange inclusive of the lip portion 15 and having an underturned narrow reinforcing flange 21 providing a finished edge for the cover. By preference, the indented rib 19 is of a diameter to enable opposed disposition thereof to and preferably engagement with the radially inner portion of the terminal flange radially extending portion 14 substantially as shown in FIGURE 2. The angle and relationship of the cover marginal portion 20 to the terminal flange is such that a substantial chamber is provided behind the cover marginal portion 20 within which wheel balancing weights are readily accommodated. Moreover, the cover marginal portion 20 is of curved or arched cross-section generally axially outwardly convex whereby to afford substantial rib-like stiffness therein.

For press-on, pry-off attachment of the cover to the wheel, an improved arrangement of cover retaining spring clips 22 is provided. The spring clips 22 are constructed and arranged to be supported in attached relation to the terminal flange 14, 15 of the tire rim and there is a preferred plurality of the clips disposed in circumferentially spaced relation, such as four or more of the clips disposed equidistantly. Moreover, the clips are constructed to be accommodated in the chamber provided between the terminal flange and the overlying marginal portion 20 of the cover.

For effective, stabilized gripping retention on the tire rim, each of the clips 22 is of sinuous longitudinal section and is provided with a loop portion 23 generally conformed to engage grippingly with the terminal flange lip portion 15, with an inner clip leg 24 engaging the radially inner side of the terminal flange portion 15 within the groove defined thereby, and a radially outer leg 25 engaging the radially outer side of the terminal flange lip portion 15 and following the contour thereof preferably to a point adjacent juncture of the terminal flange portions 14 and 15 and thereby in the assembled relationship overlapped by the adjacent sidewall of the tire 17 which additionally assures a firm retained interengagement of the clip with the wheel. Normally, the clip loop legs 24 and 25 are preferably disposed in slightly closer spaced relation than the thickness of the terminal flange lip portion 15 so that when the clip is applied to the tire rim by pressing the loop 23 onto the terminal flange lip 15, a firm gripping interengagement results. In addition, the gripping interengagement of the clip loop 23 is enhanced by having the same of several times as great a width as the length of the terminal flange gripping legs 24 and 25 so as to encompass a substantial circumferential area of segment of the terminal flange lip. For this purpose the clip loop 23 is curved transversely conformably to the curvature of the terminal flange lip portion 15, as seen in FIGURE 3.

For interengagement with the cover, each of the retaining clips 22 has a radially inner resilient loop 27 which is bowed away from the tire rim and projects generally radially inwardly and axially outwardly from the inner end of the clip loop leg 24. By preference, the clip loop 27 is substantially narrower than the attachment loop 23 of the clip, in the present instance being only about one-third or slightly less as wide as the attachment loop, and centered with respect thereto, with a flaring juncture portion 28 (FIG. 3) connecting the adjacent radially outer leg portion of the clip loop 27 to the radially inner leg 24 of the attachment loop 23. Thereby, even though the cover retaining clip loop 27 is of substantial resilient flexibility, it is held in firmly stable relation against displacement by the twisting or torsionally imposed forces or pressures thereon in a circumferential direction.

At its radially inner side, the clip loop 27 is provided with a generally axially inwardly extending resilient shoulder terminal portion 29 providing a generally radially and axially inwardly directed cover retaining shoulder engageable by the cover shoulder 19 which is in differential diameter variance relative to the clip shoulder to press the clip loop 27 radially outwardly under resilient compression. At its tip the clip loop leg 29 closely approaches the radially inner portion of the terminal flange portion 14.

Normally the clip loop leg 29 projects radially inwardly to a slightly greater diameter than the diameter to the cover rib 19, while in order to receive the clip loop 27 retainingly over the cover rib 19 in cover retaining relation, the cover marginal portion 20 adjacent to the rib is provided with a clearance recess 30 which may, if preferred, be a continuous groove opening generally radially and axially inwardly. In the present instance, however, the recess is defined by a circumferential rib structure 31 projecting generally radially inwardly and axially outwardly from the radially inner portion of the cover margin 20 and sub-divided at suitable equally spaced intervals into a plurality of pocket-like sockets by transverse indentations 32 providing stiffening or reinforcement and affording at the sides of the clip loop 27 circumferential stops preventing turning of the cover on the wheel relative to the retaining clips.

In applying the cover 10 to the outer side of the wheel, a valve stem aperture 33 (FIG. 1) is registered with a valve stem 34 that projects from the tire rim, and thereby the retaining clips 22 nearest the opposite sides of the valve stem 34 are engaged within respective ones of the clip receiving sockets afforded by the recess 30 in the cover. Then the cover is pressed axially inwardly to cam the cover rib 19 over the clip shoulder legs 29 of the remaining retaining clips and in so doing, the extremities of the clip legs 29 thrust against the terminal flange portion 14 and as the cover shoulder rib 19 cams axially inwardly, the clip legs 29 are resiliently deflected radially outwardly and then snap radially inwardly into retaining engagement within the socket recess 30 and into overlying retaining engagement to the cover shoulder rib 19 to resiliently thrust the same under tension of the clip loops 27 against the terminal flange portion 14. In this retained relationship, the cover is maintained centered and under resilient floating relation to the wheel in a diametrical sense. That is, the cover is adapted to shift to a limited extent diametrically as enabled by the resilience of the retaining clips for thereby withstanding road shocks and curbing or like thrust forces against the cover. At the same time, the retaining clips are resiliently tensioned to effect even more thorough retaining thrusting engagement of the rim engaging loop legs 24 against the terminal flange lip 15.

For removing the cover from the outer side of the wheel, a pry-off tool such as a screwdriver or the like is adapted to be inserted behind the turned reinforced edge bead flange 21 of the cover and pry-off force exerted to release the cover from the retaining clips 22. As the pry-off force progresses, the retaining clip loops 27 resists release from the cover shoulder 19 and pry-off force may have to be inserted in more direct relation to the cover shoulder 19 either directly thereagainst or against the shoulder afforded at the radially outer side of the recess socket rib 31 of the cover margin.

In the modification of FIGURES 4 and 5, the wheel is identical with the wheel in FIGURE 2 and the same reference numerals have been applied to designate identical parts. The wheel cover 10' and the retaining clips 22', however, are slightly modified and to the extent of general similarity primed similar reference numerals are used to designate substantial identity. The principal difference resides in that the construction and relationship are such that the intermediate axially inwardly directed annular cover shoulder rib 19' is more deeply drawn and of a smaller diameter so as to be disposable in assembly adjacent to the axially outer portion of the intermediate flange 13 of the tire rim in generally telescoped relation. In this relationship, the cover marginal portion 20' is somewhat wider so as nevertheless to entirely cover the terminal flange 14, 15 of the tire rim.

In order to accommodate the modification in the cover 10', the retaining clips 22' have the intermediate loop connecting portion 28' long enough so that the cover retaining resilient loop 27' is located opposite to and in straddling relation to the juncture shoulder between the intermediate flange 13 and the terminal flange portion 14. For bottoming against the tire rim, the shoulder leg 29' of the cover retaining loop of the clip is provided with a slidable terminal extremity pad structure 35 that is engageable with the intermediate flange 13.

Application and removal of the cover 10' is the same as described in connection with the cover 10.

The modification of FIGURE 6, provides a structure that is in most respects the same as the structure shown in FIGURES 4 and 5 and in general details is like the construction shown in FIGURES 1–3, the wheel body and rim being the same, and the cover 10" and the retaining clips 22" being identified in their points of similarity by double primed reference numerals. In this form, similarly as in FIGURES 4 and 5, the intermediate or loop connecting portion 28" of the retaining clips is of substantial length so as to dispose the cover retaining loop portion 27" over and in generally straddling relation to the juncture between the intermediate flange 13 and the terminal flange portion 14. In this instance, however, the retaining loops 27" of the clips are constructed to enable substantial reduction in the width and thus the prominence of the cover groove socket rib formation 31". To this end, the clip loops 27" of each of the clips is of substantially smaller radius than the clip loops 27' in FIGURE 4 and without any appreciable axially outward projection thereof so that the axially outer side of the loop 27" lies in a plane with the connecting portion 28", as shown. In other respects the clips 22" are substantially the same as the clips 22' of FIGURES 4 and 5. Application and removal of the cover 10" is the same as described in connection with the cover 10 and the cover 10'.

A substantially more stiffly resilient retaining loop structure for the clips 22" is shown in FIGURE 7 wherein the cover retaining loop of the clip is substantially the same as in FIGURE 6, being formed on a small radius of curvature. However, the cover retaining loop portion 27" is provided with a circumferentially elongated bubble-like projection 37 having the ends thereof terminating short of the sides of the loop 27". This affords a stiffly resilient retaining loop structure since the protrusion or bump or bubble formation 37 is in the nature of a reinforcing rib and provides a seat for retaining interengagement within a relatively narrow and shallow socket in the cover to be retained by the clip.

It will be understood that modifications and variations may be effected without departing from the scope of the novel concepts of the present invention.

I claim as my invention:

1. In a wheel structure including a tire rim having a terminal flange including a generally radially extending portion and a generally axially extending portion, a cover retaining spring clip carried by said terminal flange and having a sinuous longitudinal section comprising a loop portion engageable with said axially extending terminal flange portion and a radially inner loop portion projecting generally away from the tire rim and providing a cover retaining shoulder, with a terminal on said radially inner loop portion engageable in bottomed relation against the tire rim, said inner loop portion having an intermediate raised reinforcing rib portion projecting from the normal contour thereof which provides said cover retaining shoulder.

2. In a wheel structure including a circular tire rim having a terminal flange including a generally radially extending portion and a generally axially extending portion, a cover retaining spring clip carried by said terminal flange and having a sinuous longitudinal section comprising a radially outer loop portion engageable with said axially extending terminal flange portion and a radially inner loop portion projecting generally away from the tire rim and providing a cover retaining shoulder, with a terminal on said radially inner loop portion engageable in bottomed relation against the tire rim, said radially outer loop portion being about three times as wide as said radially inner loop portion and curvingly complementary to the circular shape of the rim flange to effect firm frictional engagement with the axially extending terminal flange portion and said loops being connected by an intermediate portion that flares from the radially inner loop to the terminal flange engageable loop.

3. In a wheel structure including a tire rim having a terminal flange, a plurality of cover retaining clips secured to said terminal flange and having resilient cover retaining shoulder loops on the radially inner terminal portions thereof, and a cover member for disposition over the outer side of the wheel including shoulder means engageable in resilient compressing relation with said clip loops and said clip loops under resilient tension maintaining said shoulder means thrust toward engagement with the tire rim, said clip terminal portions being yieldably bottomed against the tire rim flange.

References Cited in the file of this patent
UNITED STATES PATENTS

| | | |
|---|---|---|
| 2,137,416 | Rubsam | Nov. 22, 1938 |
| 2,239,367 | Lyon | Apr. 22, 1941 |
| 2,351,655 | Aske | June 20, 1944 |
| 2,359,248 | Rubsam | Sept. 26, 1944 |
| 2,526,026 | Horn | Oct. 17, 1950 |
| 2,584,143 | Lyon | Feb. 5, 1952 |
| 2,621,978 | Lyon | Dec. 16, 1952 |
| 2,714,041 | Lyon | July 21, 1955 |
| 2,732,261 | Lyon | Jan. 24, 1956 |
| 2,749,186 | Wood | June 5, 1956 |
| 2,757,975 | Lyon | Aug. 7, 1956 |
| 2,937,426 | Barnes | May 24, 1960 |